(12) United States Patent
Zahnen

(10) Patent No.: US 6,265,665 B1
(45) Date of Patent: Jul. 24, 2001

(54) GEL-FILLED CASING FOR AN ELECTRICAL CONNECTION AND ASSOCIATED METHOD

(75) Inventor: James L. Zahnen, Ormond Beach, FL (US)

(73) Assignee: Homac Manufacturing Company, Ormond Beach, FL (US)

( * ) Notice: Subject to any disclaimer, the term of this patent is extended or adjusted under 35 U.S.C. 154(b) by 0 days.

(21) Appl. No.: 09/451,055

(22) Filed: Nov. 30, 1999

(51) Int. Cl.$^7$ ........................................................ H01R 4/00
(52) U.S. Cl. ........................ 174/92; 174/72 C; 174/70 A
(58) Field of Search ..................... 174/92, 84 R, 174/93, 72 C, 70 A, 95

(56) References Cited

U.S. PATENT DOCUMENTS

| | | | |
|---|---|---|---|
| 3,804,971 | * 4/1974 | Bazille, Jr. ............................ | 174/88 R |
| 5,347,084 | 9/1994 | Roney et al. ............................ | 174/92 |
| 5,397,859 | 3/1995 | Robertson et al. ..................... | 174/92 |
| 5,525,073 | 6/1996 | Sampson ................................ | 439/521 |
| 5,561,269 | 10/1996 | Robertson et al. ..................... | 174/92 |
| 5,569,882 | 10/1996 | Yokoyama et al. ..................... | 174/76 |
| 5,594,210 | 1/1997 | Yabe ....................................... | 174/76 |
| 5,674,089 | 10/1997 | Sampson ................................ | 439/521 |
| 5,763,835 | 6/1998 | Huynh-Ba et al. ..................... | 174/92 |
| 5,828,005 | * 10/1998 | Huynh-Ba et al. ..................... | 174/92 |
| 6,111,121 | * 8/2000 | Drane et al. ............................ | 174/92 |

* cited by examiner

*Primary Examiner*—Dean A. Reichard
*Assistant Examiner*—William H Mayo, III
(74) *Attorney, Agent, or Firm*—Allen, Dyer, Doppelt, Milbrath & Gilchrist, P.A.

(57) ABSTRACT

A gel-filled casing for an electrical connection includes lower and upper housing portions, and a hinge connecting the lower and upper housing portions along respective edges thereof. First and second bodies of sealing gel are in respective interiors of the lower and upper housing portions. The gel-filled casing further includes at least one partial closure member for securing the lower and upper housing portions in a partially closed position with the first and second bodies of sealing gel being separated from one another. This allows the gel-filled casing to be shipped in the partially closed position. At least one full closure member is also included for securing the lower and upper housing portions in a fully closed position with the first and second bodies of sealing gel being brought together and surrounding the electrical connection for ensuring that the gel surrounds the exposed conductors for preventing contact with moisture.

37 Claims, 4 Drawing Sheets

GEL-FILLED CASING FOR AN ELECTRICAL CONNECTION AND ASSOCIATED METHOD

FIELD OF THE INVENTION

The present invention relates to environmental sealing and protection devices, and, more particularly, to a moisture resistant casing for connected electrical cables or wires.

BACKGROUND OF THE INVENTION

When a cable is connected to another cable, it is customary to strip back the insulation from each cable to expose the respective underlying conductors to make the connection. It is also desirable to thereafter environmentally protect the connection, particularly against moisture.

A number of approaches have been developed to environmentally protect an electrical connection. One advantageous way is to use a gel-filled casing, wherein the gel surrounds the exposed connection for preventing contact with water. For example, U.S. Pat. Nos. 5,763,835 and 5,828,005 both to Huynh-Ba et al. disclose a gel-filled casing having generally rectangularly shaped lower and upper housing portions joined along side edges by a living hinge. First and second bodies of sealing gel are in respective interiors of the lower and upper housing portions. The gel-filled casing includes closure members for securing the lower and upper housing portions in a fully closed position with the first and second bodies of sealing gel being brought together and surrounding an electrical connection positioned within the gel-filled casing.

Another gel-filled casing is disclosed in U.S. Pat. Nos. 5,347,084 and 5,525,073 both to Roney et al. The casing also includes lower and upper housing portions connected by a hinge. The casing further includes end seals which break away upon the filling of the interior of the lower and upper housing portions with a sealing gel. Closure members secure the lower and upper housing portions in a fully closed position with the sealing gel being brought together and surrounding an electrical connection positioned within the gel-filled casing.

Similar gel-filled casings are further disclosed in U.S. Pat. Nos. 5,397,859 and 5,561,269 to Robertson et al, U.S. Pat. No. 5,594,210 to Yabe, U.S. Pat. No. 5,569,882 to Yokoyama et al. and U.S. Pat. No. 5,674,089 to Sampson.

The gel-filled casings disclosed in the above referenced patents are either opened or fully closed. This may cause difficulty in shipping. If the gel-filled casing is shipped in the fully closed position, there may be problems separating the gel-filled bodies after they contact one another. If the gel-filled casing is shipped in the fully open position, the exposed gel-filled bodies may have to be protected from contacting the packaging material. Consequently, there is a need for a gel-filled casing that avoids these difficulties.

SUMMARY OF THE INVENTION

In view of the foregoing background, it is therefore an object of the present invention to provide a gel-filled casing for an electrical connection that avoids the packaging and shipping difficulties described above.

Another object of the present invention is to provide a gel-filled casing for an electrical connection that ensures the gel seals around the electrical connection when closed, and an associated method for using the gel-filled casing.

These and other objects, advantages, and features in accordance with the present invention are provided by a gel-filled casing for an electrical connection preferably comprising lower and upper housing portions, and a hinge connecting the lower and upper housing portions along respective edges thereof, and wherein a partially closed position is provided. First and second bodies of sealing gel are preferably in respective interiors of the lower and upper housing portions. Moreover, at least one partial closure member preferably secures the lower and upper housing portions in the partially closed position with the first and second bodies of sealing gel being separated from one another. The gel-filled casing preferably further includes at least one full closure member for securing the lower and upper housing portions in a fully closed position with the first and second bodies of sealing gel being brought together and surrounding an electrical connection positioned within the gel-filled casing.

The hinge preferably urges the lower and upper housing portions toward an open position to thereby cooperate with the at least one partial closure member to secure the lower and upper housing portions in the partially closed position. Partially closing the gel-filled casing provides advantages for shipping. In other words, the difficulty associated with separating the gel-filled bodies if shipped in the fully closed position is avoided, and the difficulty of protecting the gel-filled bodies if shipped in the fully open position is also avoided.

The gel-filled casing preferably further comprises lower and upper flanges extending outwardly from respective edges of the lower and upper housing portions opposite the hinge. The partial closure member preferably comprises a plurality of partial closure tabs extending generally perpendicularly outwardly from the lower flange. The upper flange may have a plurality of corresponding partial closure tab receiving notches in an outer edge thereof.

The full closure member preferably comprises a plurality of full closure tabs extending generally perpendicularly outwardly from the lower flange. Similarly, the upper flange may have a plurality of corresponding full closure tab receiving notches in an outer edge thereof. Each of the partial closure tabs preferably has a greater length than each of the full closure tabs.

The lower and upper housing portions each preferably comprises opposing flexible end walls conforming to cables passing therethrough. Each of the lower and upper housing portions preferably comprises an outer wall opposite the hinge. The outer wall of the lower housing portion preferably has a recess therein, and the outer wall of the upper housing portion preferably comprises a barrier lip extending downwardly therefrom for mating with the recess and for confining the sealing gel as the lower and upper housing portions are moved to the closed position with the electrical connection therein. When the gel-filled casing is in the partially closed position, the barrier lip also preferably partially engages the recess.

Another aspect of the present invention relates to a method for using a gel-filled casing comprising lower and upper housing portions joined along respective edges by a hinge, with first and second bodies of sealing gel in respective interiors of the lower and upper housing portions. The gel-filled casing preferably has a partially closed position with the first and second bodies of sealing gel being separated from one another, and a fully closed position with the first and second bodies of sealing gel being brought together. The method preferably comprises the steps of assembling and shipping the gel-filled casing in the partially closed position, opening the gel-filed casing and placing the electrical connection therein, and bringing the lower and upper housing portions together about the electrical connection to the fully closed position.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and completes and will fully convey the scope of the invention to those skilled in the art. Like numbers refer to like elements throughout.

Figure 1:
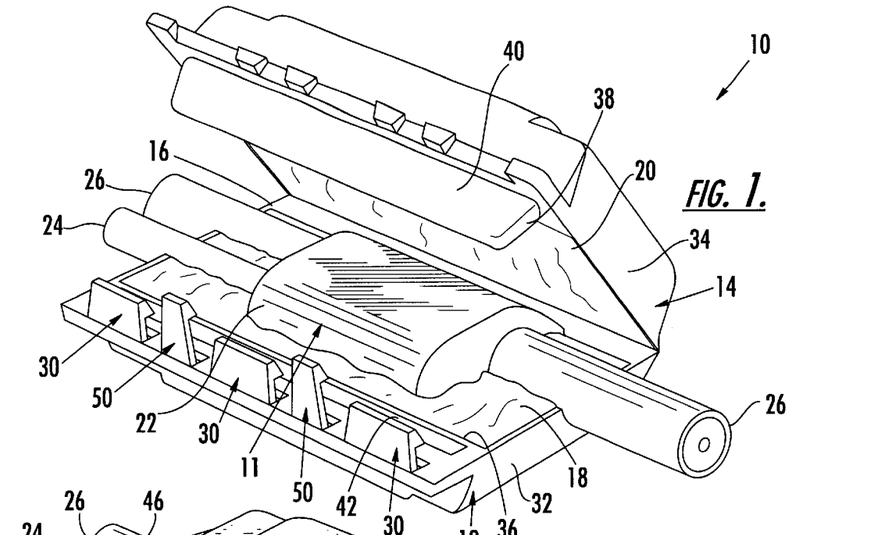
FIG. 1 is a perspective view of the gel-filled casing illustrated in an open position with an electrical connection positioned therein in accordance with the present invention.
Figure 2:
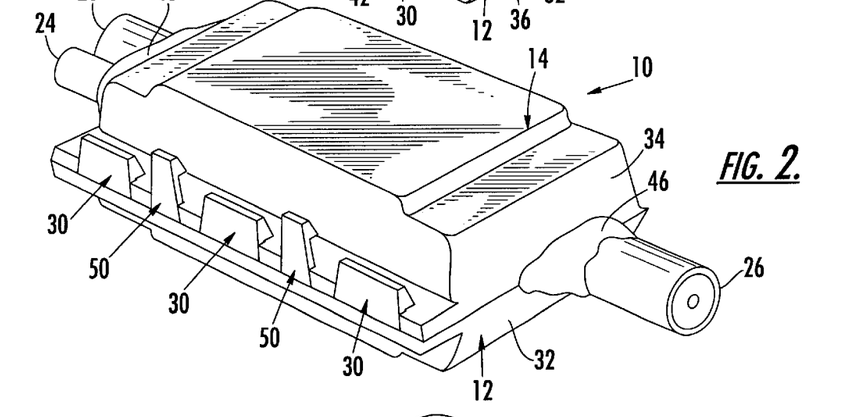
FIG. 2 is a perspective view of the gel-filled casing as shown in FIG. 1 illustrated in a fully closed position.
Figure 3:
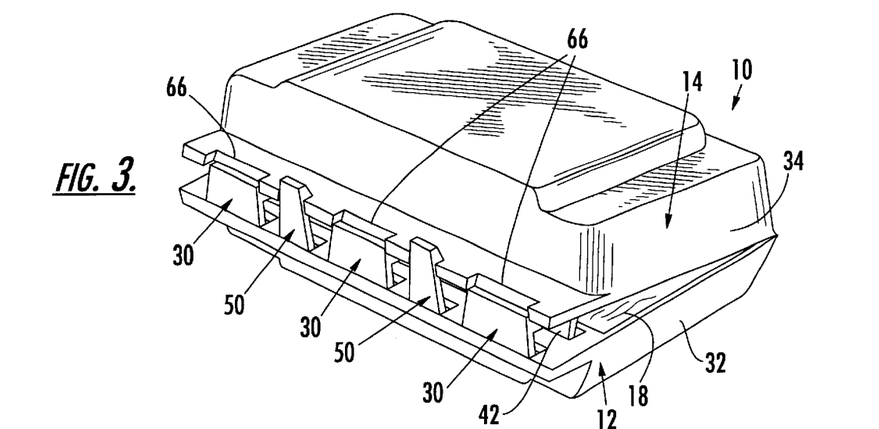
FIG. 3 is a perspective view of the gel-filled casing as shown in FIG. 1 illustrated in a partially closed position and without the electrical connection.

Referring initially to FIGS. 1–3; a gel-filled casing 10 for an electrical connection 11 is described in accordance with the present invention. The gel-filled casing 10 comprises first and second housing portions 12 and 14, and a hinge 16 connecting the first and second housing portions along respective edges thereof. For simplicity, the first and second housing portions 12, 14 hereinafter are respectively referred to as the lower and upper housing portions. The lower and upper housing portions 12, 14 and the hinge 16 are preferably formed of integrally molded plastic, such as polypropylene, nylon, or polyethylene.

First and second bodies of sealing gel 18, 20 are in respective interiors of the lower and upper housing portions 12, 14. The sealing gel may include silicone gel, urea gel, urethane gel or any suitable sealing gel material as will be readily known by one skilled in the art. The electrical connection 11 is illustratively provided by an H-tap crimp connector 22 tapping an end of a first cable 24 to a portion of a second cable 26, although other connectors may also be used. The tap configuration is for illustrative purposes only, and other electrical connection configurations, such as, for example, an end-to-end splice of two cables, are also contemplated by the present invention.

The gel-filled casing 10 includes at least one full closure member 30 for securing the lower and upper housing portions 12, 14 in a fully closed position with the first and second bodies of sealing gel 18, 20 being brought together and surrounding the connector 22 (FIG. 2). The full closure member 30 will be described in greater detail below. Each of the lower and upper housing portions 12, 14 respectively comprises opposing flexible end walls 32, 34 conforming to cables 24, 26 passing therethrough as also understood with reference to FIG. 2.

Referring more particularly to FIG. 1, the lower and upper housing portions 12, 14 each comprises an outer wall 36, 38 opposite the hinge 16. The outer wall 36 of the lower housing portion 12 has a recess 42 therein. The outer wall 38 of the upper housing portion comprises a barrier lip 40 extending downwardly for engaging the recess 42. Consequently, the bodies of sealing gel 18, 20 are confined by the barrier lip 40 as the lower and upper housing portions 12, 14 are moved to the closed position (FIG. 2) with the electrical connection 11 therein. In the fully closed position, sealing gel as indicated by reference numeral 46 is forced out along the flexible end walls 32, 34 as best shown in FIG. 2.

An advantageous feature of the gel-filled casing 10 is that the partial closure member 50 secures the lower and upper housing portions 12, 14 in a partially closed position with the first and second bodies of sealing gel 18, 20 being separated from one another, as best shown in FIG. 3. This feature of the invention allows the gel-filled casing 10 to be shipped in a partially closed position. Consequently, handling of the gel-filled casing 10 is simplified, as readily appreciated by one skilled in the art.

In the partially closed position, the barrier lip 40 partially engages the recess 42. The hinge 16 urges the lower and upper housing portions 12, 14 toward an open position to thereby cooperate with the partial closure member 50 to secure the lower and upper housing portions in the partially closed position. The partial closure member 50 will be described in greater detail below. The gel-filled casing 10 is easily opened from the partially closed position so that the connector 22 and cables 24, 26 can be placed therein.

Figure 4:
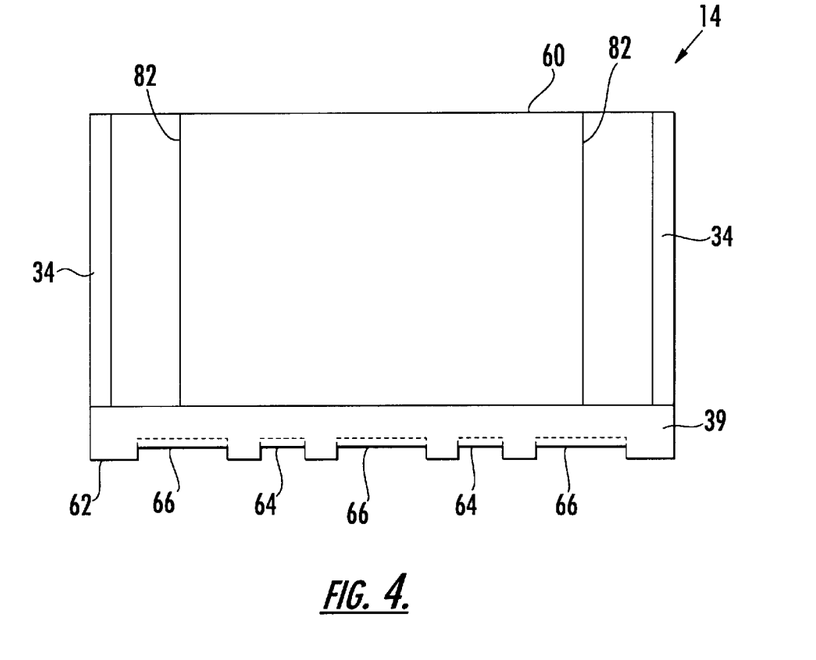
FIG. 4 is a plan view of the outside of the upper housing portion of the gel-filled casing as shown in FIG. 1.

The upper housing portion 14 will be described in greater detail with reference to FIGS. 4–5. In the illustrated embodiment, the upper housing portion 14 has a generally rectangular shape. Other configurations are also possible for the casing, such as cylindrical, for example, wherein each housing portion has a half-cylindrical shape. The hinge 16 connecting the lower and upper housing portions 12, 14 preferably runs along the full length of edge 60. Adjacent the hinge 16 are opposing flexible end walls 34 conforming to cables 24, 26 passing therethrough.

Opposite edge 60 and adjacent the opposing flexible end walls 34, an upper flanges 39 extends outwardly from the hinge 16. Along the outer edge 62 of the upper flanges 39, a plurality of partial closure tab and full closure tab receiving notches 64, 66 are spaced therealong. These receiving notches 64, 66 correspond with respective partial and full closure tabs 74, 76 as will be described in further detail with reference to the lower housing portion 12. The respective outer edges 62a, 62b of the partial closure tab receiving notches 64 and the full closure tab receiving notches 66 are slanted for slidably engaging the respective closure tabs 74, 76.

As will be readily appreciated by those skilled in the arts the notches 64, 66 may be defined by openings through portions of the upper flanges 39 in an alternate embodiment. In other words, the notches 64, 66 in some embodiments may not open fully outwardly as shown in the illustrated embodiment. The term "notch" as used herein is intended to cover these other embodiments as well.

Figure 5:
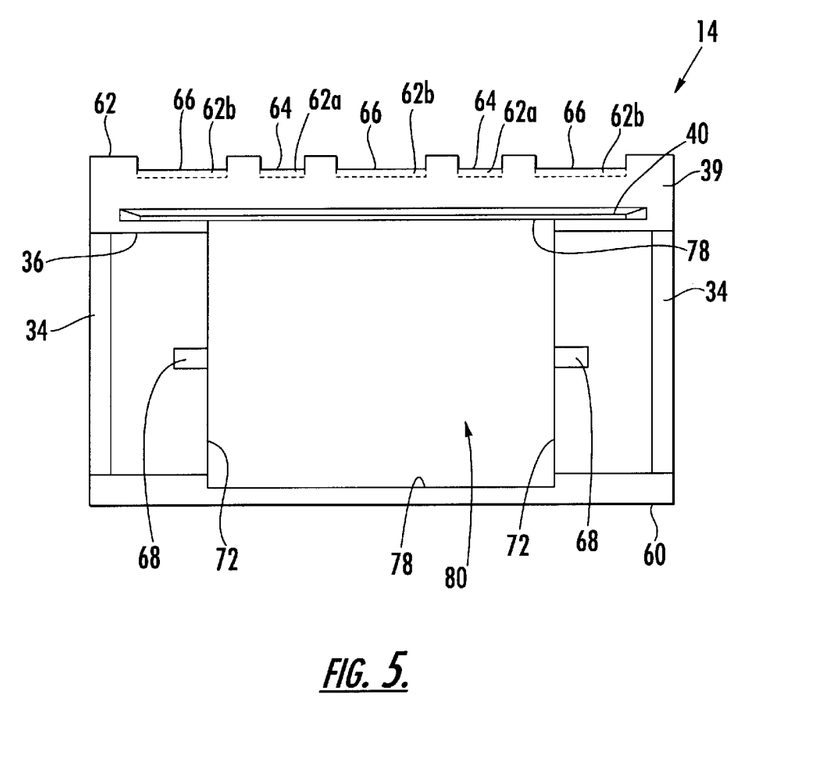
FIG. 5 is a plan view of the inside of the upper housing portion as shown in FIG. 4.

Within the interior portion of the upper housing portion 14, an outer wall 36 is opposite edge 60, as best shown in FIG. 5. The outer wall 36 preferably comprises the barrier lip 40 extending downwardly therefrom for confining the sealing gel as the lower and upper housing portions 12, 14 are moved to the closed position with the electrical connection 11 therein. The barrier lip 40 preferably has a tapered edge and is received by a mating recess 42 in the lower housing portion 12.

Also within the interior portion of the upper housing portion 14 are electrical connection retaining members 68. The electrical connection retaining members 68 are preferably centered so that the electrical connection 11 is centered and retained in this position within the gel-filled casing 10. In addition, the electrical connection retaining members 68 are adjacent recessed edges 71. Recessed edges 72, in combination with adjacent recessed edges 78, define a recessed area 80 also for receiving and retaining the electrical connection 11 positioned within the upper housing portion 14. The recessed area 80 extends outward from the outer surface of the upper housing portion 14, as identified by edges 82 in FIG. 4.

In the illustrated embodiment, the gel-filled casing 10 is compact, with dimensions of about 3.25 inches long by 2 inches wide. More particularly edge 60 of the illustrated upper housing portion 14 has a length of about 3.3 in., and a length of about 1.7 in. for the flexible end walls 34. The upper flanges 39 has a width of about 0.3 in. A width of the partial closure tab and full closure tab receiving notches 64, 66 are respectively about 0.25 in. and 0.5 in. The barrier lip 40 has a width of about 0.07 in., extends outwardly about 0.3 in. and has a length of about 3.0 in. In addition, the recessed interior area 80 for receiving the electrical connection 11 has a length of about 1.8 in. along edge 72, which is slightly greater than the length of the opposing flexible end walls 34, a length of about 2.1 in. along edge 78, and a corresponding depth of about 0.1 in. These dimensions are for illustrative purposes only, and are to be appropriately adjusted depending on the size of the electrical connection 11 and/or cable sizes, as will be readily appreciated by one skilled in the art.

Figure 6:
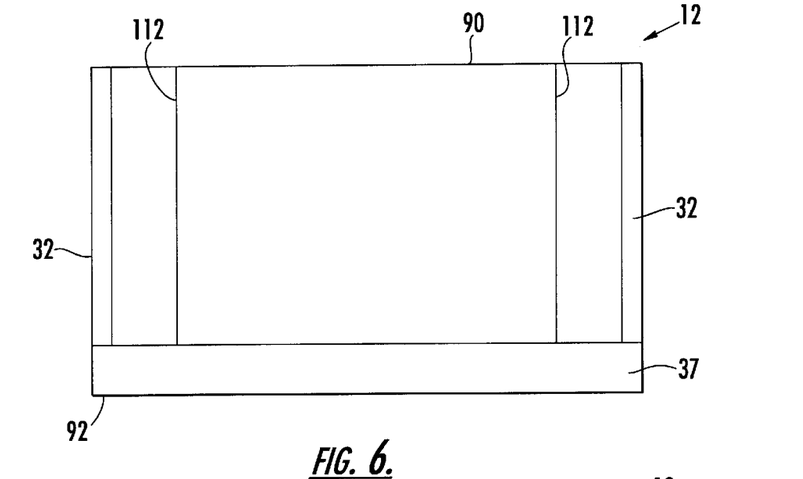
FIG. 6 is a plan view of the outside of the lower housing portion of the gel-filled casing as shown in FIG. 1.

The lower housing portion 12 will be now described in greater detail with reference to FIGS. 6–8. In the illustrated embodiment, the lower housing portion 12 has a generally rectangular shape corresponding to the generally rectangular shape of the upper housing portion 14, although other shapes are also possible. The hinge 16 connecting the lower and upper housing portions 12, 14 preferably runs along the full length of edge 90. Adjacent the hinge 16 are opposing flexible end walls 32 conforming to cables 24, 26 passing therethrough.

Opposite edge 90 and adjacent the opposing flexible end walls 32, a lower flanges 37 extends outwardly from the hinge 16. Along the outer edge 92 of the lower flanges 37, a plurality of partial closure tabs 74 and full closure tabs 76 extend perpendicularly from the flange. These tabs 74, 76 align with the respective receiving notches 64, 66 described above with reference to the upper housing portion 14. The partial closure and full closure tabs 74, 76 may be placed on the upper housing portion 14 instead of the lower housing portion 12, wherein the corresponding receiving notches are placed on the lower housing portion 12, as readily appreciated by one skilled in the art. In addition, the partial closure tabs 74 can be on one housing portion, and the full closure tabs 76 may be on the other housing portion. Of course, in other embodiments, the partial closure tabs 74 and/or the full closure tabs 76 may be split among the two housing portions.

Figure 8:
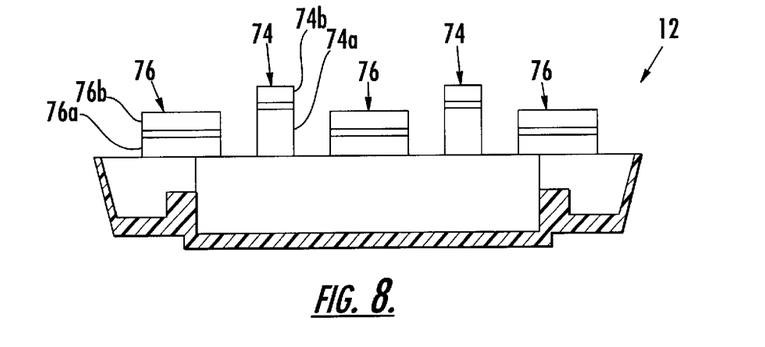
FIG. 8 is a cross-sectional view taken along line 8—8 of FIG. 7.
Figure 9:
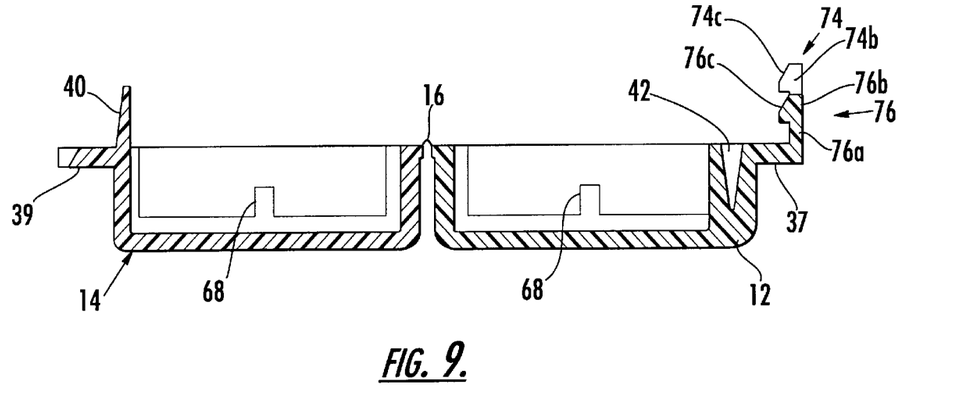
FIG. 9 is a transverse cross-sectional view of the upper and lower housing portions of the casing as shown in FIG. 1 illustrated in a fully open position and with the gel removed.

The partial closure tabs 74 have a length or height greater than the length or height of the full closure tabs 76, as best shown in FIG. 8. The partial closure tabs 74 and the full closure tabs 76 each comprises a body portion 74a, 76a and a locking end portion 74b, 76b connected thereto. Outer surfaces 74c, 76c of the locking end portions 74b, 76b are tapered for slidably engaging respective receiving notches 64, 66 as best shown in FIG. 9.

The partial closure and full closure tabs 74, 76 are somewhat flexible, as they are integrally formed of plastic with the lower and upper housing portions 12, 14. Consequently, when the gel-filled casing 10 is in the partially closed position, the partial closure tabs 74 can be separated from the partial closure tab receiving notches 64 and opened. Even in the fully closed position, the full closure tabs 76 can be separated from the full closure tab receiving notches 66 to open the gel-filled casing 10.

Figure 7:
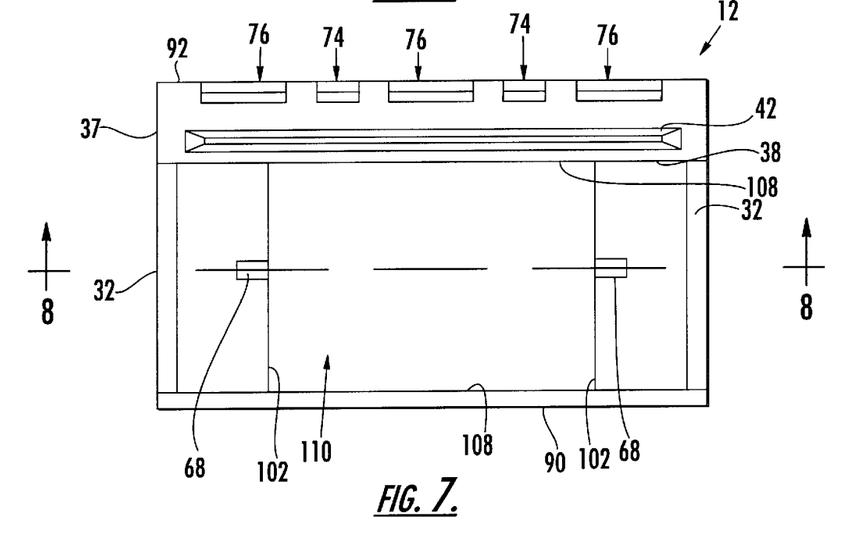
FIG. 7 is a plan view of the inside of the lower housing portion as shown in FIG. 6.

Within the interior portion of the lower housing portion 12, an outer wall 38 is opposite edge 90, as best shown in FIG. 7. The outer wall 38 preferably comprises a recess 42 therein for mating with the barrier lip 40 in the partially closed position, e.g., when shipping the gel-filled casing 10, and in the fully closed position, e.g., when the electrical connection 11 has been placed therein. The recess 42 preferably has tapered sidewalls as illustrated.

Also within the interior portion of the lower housing portion 12 are electrical connection retaining members 68. The electrical connection retaining members 68 are similar to the electrical connection retaining members in the upper housing portion 14. In addition, the electrical connection retaining members 68 are adjacent recessed edges 102. Recessed edges 102, in combination with recessed edges 108, define a recessed area 110 for receiving the electrical connection 11 positioned therein. The recessed area 110 extends outward from the outer surface of the lower housing portion 12, as identified by edges 112 in FIG. 6.

In the illustrated embodiment of the lower housing portion 12, edge 90 has a length of about 3.3 in., and a length of the flexible opposing end walls 32 is about 1.7 in. The lower flanges 37 has a width of about 0.25 in. A width of the partial closure and full closure tabs 74, 76 are respectively about 0.2 in. and 0.5 in. A height of the partial closure and full closure tabs 74, 76 are respectively about 0.4 in. and about 0.3 in. The recess 42 has an opening width of about 0.1 in., a tapering width of about 0.03 in., a depth of about 0.4 in. and a length of about 3.0 in. In addition, the dimensions of the recessed interior area 110 for receiving the connection 11 are the same as the recessed area 80 in the upper housing portion 14, and will not be further described. As stated above, these dimensions are for illustrative purposes only, and are to be appropriately adjusted depending on the size of the tap and/or cable sizes, as readily appreciated by one skilled in the art.

The hinge 16 joining the lower and upper housing portions is preferably a living hinge, as best shown in FIG. 9.

Figure 10:
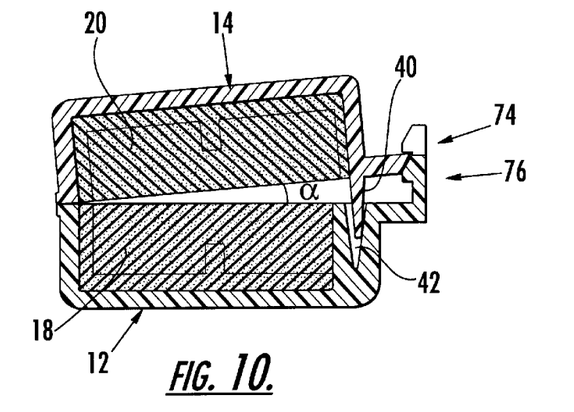
FIG. 10 is a transverse cross-sectional view of the upper and lower housing portions of the casing as shown in FIG. 1 illustrated in a partially closed position and with the gel therein.
Figure 11:
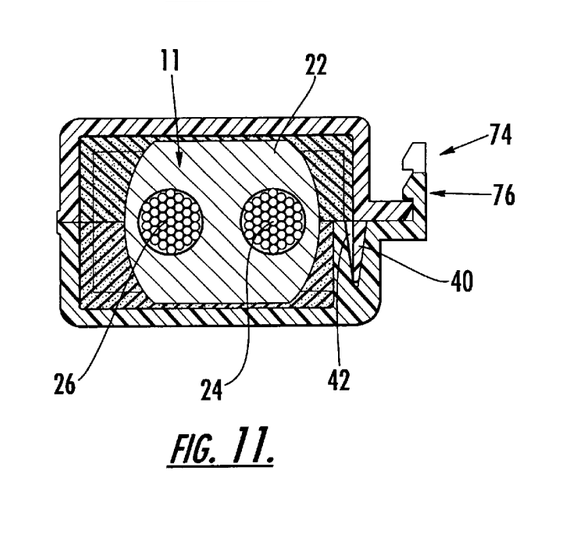
FIG. 11 is a transverse cross-sectional view of the upper and lower housing portions of the casing as shown in FIG. 1 illustrated in a fully closed position and with the electrical connection therein.

When the gel-filled casing 10 is to be shipped, the partial closure tabs 74 are engaged with the partial closure tab receiving notches 64. The living hinge 16 biases the lower and upper housing portions 12, 14 toward an open position to thereby cooperate with the at least one partial closure member 50 to secure the lower and upper housing portions in the partially closed position. In the partially closed position, the barrier lip 40 of the upper housing portion 14 engages the recess 42 in the lower housing portion 12, as also shown by the cross sectional view of the gel-filled casing 10 in FIG. 10. In the partially closed position, the first and second bodies of sealing gel 18, 20 are separated from one another. As also shown in FIG. 10 the geometry of the housing portions 12, 14 and partial closure tabs 74 may define a partially closed position angle α of about 5 degrees, although other angles are also possible. With the electrical connection 11 in the gel-filled casing 10, the barrier lip 40 fully engages the recess 42, as well as the full closure tabs 76 engaging the full closure tab receiving notches 66, as best shown in FIG. 11.

Another aspect of the present invention relates to a method for using a gel-filled casing 10 comprising lower and upper housing portions 12, 14 joined along respective edges by a hinge 16, and first and second bodies of sealing gel 18, 20 in respective interiors of the lower and upper housing portions. The gel-filled casing 10 supports a partially closed position with the first and second bodies of sealing gel 18, 20 being separated from one another, and a fully closed position with the first and second bodies of sealing gel being brought together. The method preferably comprises the steps of assembling and shipping the gel-filled casing 10 in the partially closed position, opening the gel-filed casing and placing the electrical connection 11 therein, and bringing the lower and upper housing portions 12, 14 together about the electrical connection to the fully closed position.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed and that modifications and embodiments are intended to be included within the scope of the appended claims.

That which is claimed is:

1. A gel-filled casing for an electrical connection comprising:
    first and second housing portions, and a hinge connecting the first and second housing portions along respective edges thereof;
    first and second bodies of sealing gel in respective interiors of said first and second housing portions;
    at least one partial closure member for securing said first and second housing portions in a partially closed position with said first and second bodies of sealing gel being separated from one another; and
    at least one full closure member for securing said first and second housing portions in a fully closed position with said first and second bodies of sealing gel being brought together and surrounding an electrical connection positioned within the gel-filled casing.

2. A gel-filled casing according to claim 1 wherein said hinge urges said first and second housing portions toward an open position to thereby cooperate with said at least one partial closure member to secure said first and second housing portions in the partially closed position.

3. A gel-filled casing according to claim 1 wherein said first and second housing portions and said hinge comprise integrally molded plastic.

4. A gel-filled casing according to claim 1 wherein said first and second housing portions each has a generally rectangular shape.

5. A gel-filled casing according to claim 1 further comprising first and second flanges extending outwardly from respective edges of said first and second housing portions opposite said hinge.

6. A gel-filled casing according to claim 5 wherein said at least one partial closure member comprises a plurality of partial closure tabs extending generally perpendicularly outwardly from said first flange; and wherein said second flange has a plurality of corresponding partial closure tab receiving notches in an outer edge thereof.

7. A gel-filled casing according to claim 6 wherein said at least one full closure member comprises a plurality of full closure tabs extending generally perpendicularly outwardly from said first flange; and wherein said first flange has a plurality of corresponding full closure tab receiving notches in an outer edge thereof.

8. A gel-filled casing according to claim 7 wherein each of said partial closure tabs has a greater length than each of said full closure tabs.

9. A gel-filled casing according to claim 7 wherein said partial and full closure tabs each comprises a body portion and locking end portion connected thereto.

10. A gel-filled casing according to claim 1 wherein each of said first and second housing portions comprises opposing flexible end walls conforming to cables passing therethrough.

11. A gel-filled casing according to claim 1 wherein each of said first and second housing portions comprises an outer wall opposite said hinge; wherein the outer wall of said first housing portion has a recess therein; and wherein the outer wall of said second housing portion comprises a barrier lip extending downwardly therefrom for confining the sealing gel as said first and second housing portions are moved to the closed position with the electrical connection therein.

12. A gel-filled casing according to claim 11 wherein said barrier lip partially engages said recess in the partially closed position.

13. A gel-filled casing according to claim 1 further comprising respective electrical connection retaining members on interior portions of said first and second housing portions.

14. A gel-filled casing for an electrical connection comprising:
    first and second housing portions each having a generally rectangular shape, and a hinge connecting said first and second housing portions along respective edges thereof;
    first and second bodies of sealing gel in respective interiors of said first and second housing portions;
    at least one partial closure member for securing said first and second housing portions in a partially closed position with said first and second bodies of sealing gel being separated from one another; and
    at least one full closure member for securing said first and second housing portions in a fully closed position with said first and second bodies of sealing gel being brought together and surrounding the electrical connection positioned within the gel-filled casing;
    each of said first and second housing portions comprising an outer wall opposite said hinge, the outer wall of said first housing portion having a recess therein, and the outer wall of said second housing portion comprising a barrier lip extending downwardly therefrom for confining the sealing gel as said first and second housing portions are moved to the closed position with the electrical connection therein.

15. A gel-filled casing according to claim 14 wherein said hinge urges said first and second housing portions toward an open position to thereby cooperate with said at least one partial closure member to secure said first and second housing portions in the partially closed position.

16. A gel-filled casing according to claim 14 wherein said barrier lip partially engages said recess in the partially closed position.

17. A gel-filled casing according to claim 14 wherein said first and second housing portions and said hinge comprise integrally molded plastic.

18. A gel-filled casing according to claim 14 further comprising first and second flanges extending outwardly from respective edges of said first and second housing portions opposite said hinge.

19. A gel-filled casing according to claim 18 wherein said at least one full closure member comprises a plurality of full closure tabs extending generally perpendicularly outwardly from said first flange; and wherein said first flange has a plurality of corresponding full closure tab receiving notches in an outer edge thereof.

20. A gel-filled casing according to claim 18 wherein said at least one partial closure member comprises a plurality of partial closure tabs extending generally perpendicularly outwardly from said first flange; and wherein said second flange has a plurality of corresponding partial closure tab receiving notches in an outer edge thereof.

21. A gel-filled casing according to claim 14 wherein each of said first and second housing portions comprises opposing flexible end walls conforming to cables passing therethrough.

22. A gel-filled casing according to claim 14 further comprising respective electrical connection retaining members on interior portions of said first and second housing portions.

23. A gel-filled casing for an electrical connection comprising:
   first and second housing portions, and a hinge connecting said first and second housing portions along respective edges thereof;
   first and second bodies of sealing gel in respective interiors of said first and second housing portions; and
   at least one closure member for securing said first and second housing portions in a partially closed position with said first and second bodies of sealing gel being separated from one another.

24. A gel-filled casing according to claim 23 wherein said hinge urges said first and second housing portions toward an open position to thereby cooperate with said at least one closure member to secure said first and second housing portions in the partially closed position.

25. A gel-filled casing according to claim 23 wherein said first and second housing portions and said hinge comprise integrally molded plastic.

26. A gel-filled casing according to claim 23 further comprising first and second flanges extending outwardly from respective edges of said first and second housing portions opposite said hinge.

27. A gel-filled casing according to claim 26 wherein said at least one closure member comprises a plurality of partial closure tabs extending generally perpendicularly outwardly from said first flange; and wherein said second flange has a plurality of corresponding partial closure tab receiving notches in an outer edge thereof.

28. A gel-filled casing according to claim 23 wherein said at least one closure members comprises a body portion and locking end portion connected thereto.

29. A gel-filled casing according to claim 23 wherein each of said first and second housing portions comprises opposing flexible end walls conforming to cables passing therethrough.

30. A gel-filled casing according to claim 23 wherein each of said first and second housing portions comprises an outer wall opposite said hinge; wherein the outer wall of said first housing portion has a recess therein; and wherein the outer wall of said second housing portion comprises a barrier lip extending downwardly therefrom for confining the sealing gel as the first and second housing portions are moved to the closed position with the electrical connection therein.

31. A gel-filled casing according to claim 30 wherein said barrier lip partially engages said recess in the partially closed position.

32. A gel-filled casing according to claim 23 further comprising respective electrical connection retaining members on interior portions of said first and second housing portions.

33. A method for using a gel-filled casing comprising first and second housing portions joined along respective edges by a hinge, first and second bodies of sealing gel in respective interiors of the first and second housing portions, the casing having a partially closed position with the first and second bodies of sealing gel being separated from one another and a fully closed position with the first and second bodies of sealing gel being brought together, the method comprising the steps of:
   assembling and shipping the gel-filled casing in the partially closed position;
   opening the gel-filed casing and placing the electrical connection therein; and
   bringing the first and second housing portions together about the electrical connection to the fully closed position.

34. A method according to claim 33 wherein the hinge urges the first and second housing portions toward an open position to thereby cooperate with the at least one partial closure member to secure the first and second housing portions in the partially closed position.

35. A method according to claim 33 wherein each of the first and second housing portions comprises opposing flexible end walls conforming to cables passing therethrough.

36. A method according to claim 33 wherein each of the first and second housing portions comprises an outer wall opposite the hinge; wherein the outer wall of the first housing portion has a recess therein; wherein the outer wall of the second housing portion comprises a barrier lip extending downwardly therefrom; and wherein the step of bringing the first and second housing portions together comprises confining the sealing gel as the first and second housing portions are moved to the closed position with the electrical connection therein.

37. A method according to claim 36 wherein shipping the gel-filled casing comprises partially engaging the barrier lip in the recess for placing the gel-filled casing in the partially closed position.

* * * * *

UNITED STATES PATENT AND TRADEMARK OFFICE
CERTIFICATE OF CORRECTION

PATENT NO. : 6,265,665 B1
APPLICATION NO. : 09/451055
DATED : July 24, 2001
INVENTOR(S) : James L. Zahnen It is certified that error appears in the above-identified patent and that said Letters Patent is hereby corrected as shown below:

| | |
|---|---|
| Column 2, Line 67 | Delete: "gel-filed" <br> Insert --gel-filled-- |
| Column 3, Line 48 | Delete: "completes" <br> Insert --complete-- |
| Column 4, Line 61 | Delete: "flanges 39" <br> Insert --flange 39-- |
| Column 4, Line 62 | Delete: "flanges 39" <br> Insert --flange 39-- |
| Column 5, Line 7 | Delete: "flanges 39" <br> Insert --flange 39-- |
| Column 5, Line 28 | Delete; "edges 71" <br> Insert --edges 72-- |
| Column 5, Line 40 | Delete: "flanges 39" <br> Insert --flange 39-- |
| Column 5, Line 65 | Delete: "flanges 37," <br> Insert --flange 37,-- |
| Column 6, Line 52 | Delete: "flanges" <br> Insert --flange37-- |
| Column 7, Line 30 | Delete: "gel-filed" <br> Insert --gel-filled-- |

UNITED STATES PATENT AND TRADEMARK OFFICE
CERTIFICATE OF CORRECTION

PATENT NO. : 6,265,665 B1
APPLICATION NO. : 09/451055
DATED : July 24, 2001
INVENTOR(S) : James L. Zahnen It is certified that error appears in the above-identified patent and that said Letters Patent is hereby corrected as shown below:

Column 10, Line 4    Delete: "members"
                           Insert --member--

Signed and Sealed this

Fifth Day of December, 2006

JON W. DUDAS
*Director of the United States Patent and Trademark Office*